United States Patent
Ikeda

(10) Patent No.: US 11,037,381 B2
(45) Date of Patent: Jun. 15, 2021

(54) VEHICLE DRIVE TRAIN TEST SYSTEM AND VEHICLE DRIVE TRAIN TEST METHOD

(71) Applicant: HORIBA, Ltd., Kyoto (JP)

(72) Inventor: Hiroyuki Ikeda, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 16/003,713

(22) Filed: Jun. 8, 2018

(65) Prior Publication Data

US 2019/0019357 A1    Jan. 17, 2019

(30) Foreign Application Priority Data

Jul. 14, 2017    (JP) .............................. JP2017-138554

(51) Int. Cl.
*G07C 5/08* (2006.01)
*G01M 13/02* (2019.01)
*G01M 17/02* (2006.01)
*G01M 13/025* (2019.01)

(52) U.S. Cl.
CPC ......... *G07C 5/0808* (2013.01); *G01M 13/025* (2013.01); *G01M 17/022* (2013.01)

(58) Field of Classification Search
None
See application file for complete search history.

(56) References Cited

U.S. PATENT DOCUMENTS 3,905,225 A * 9/1975 Moss ..................... G01L 5/13
                                                        73/116.06
6,754,615 B1 * 6/2004 Germann ............... G06F 30/23
                                                        703/8
(Continued)

FOREIGN PATENT DOCUMENTS

EP        1840552 A2    10/2007
JP        07-043253 A    2/1995
(Continued)

OTHER PUBLICATIONS

Steef De Bakker, "Design of a traction control system for the four-wheel driven race car", Jan. 2017 (Year: 2017).*

(Continued)

*Primary Examiner* — Yuen Wong
*Assistant Examiner* — Hongye Liang
(74) *Attorney, Agent, or Firm* — Brooks Kushman P.C.

(57) ABSTRACT

The present invention is one that enables an actual vehicle run on a chassis dynamometer to be reproduced in a vehicle drive train test, and includes: a loading device to be connected to a rotating shaft of a vehicle drive train; and a load controller that controls the loading device to change a load. In addition, the load controller includes a relationship data storage part adapted to store speed-load relationship data indicating the relationship between rotation speed of the loading device and a load corresponding to the rotation speed, and changes the timing of the load to be given by the loading device correspondingly to the rotation speed of the loading device with respect to timing determined by the speed-load relationship data. Alternatively, the load controller changes the load correspondingly to the rotation speed of a roller mounted with a tire in the chassis dynamometer.

6 Claims, 4 Drawing Sheets

(56) References Cited

U.S. PATENT DOCUMENTS

| | | | |
|---|---|---|---|
| 7,782,183 B2* | 8/2010 | Wieser | B60C 23/0437 340/447 |
| 2015/0203123 A1* | 7/2015 | Darnell | B60W 10/111 701/37 |
| 2015/0219529 A1 | 8/2015 | Akiyama et al. | |
| 2017/0336289 A1* | 11/2017 | Pfister | G01M 13/025 |
| 2017/0369050 A1* | 12/2017 | Varnhagen | B60W 10/184 |

FOREIGN PATENT DOCUMENTS

| | | |
|---|---|---|
| JP | 2000-314680 A | 11/2000 |
| JP | 2003-294584 A | 10/2003 |
| JP | 2011-149921 A | 8/2011 |
| JP | 2015-127651 A | 7/2015 |
| WO | 2016012575 A1 | 1/2016 |

OTHER PUBLICATIONS

EESR dated Nov. 30, 2018 issued for European Patent Application No. 18 176 608.0, 8 pgs.
Office Action dated Mar. 10, 2020 issued for European Patent Application No. 18 176 608.0, 5 pgs.
Notice of Allowance dated Apr. 22, 2021 issued in JP patent application No. 2017-138554, 6 pgs.

\* cited by examiner

VEHICLE DRIVE TRAIN TEST SYSTEM AND VEHICLE DRIVE TRAIN TEST METHOD

CROSS-REFERENCE TO RELATED APPLICATION

This application claims priority to Japanese Application No. 2017-138554, filed Jul. 14, 2017, the disclosure of which is incorporated in its entirety by reference herein.

TECHNICAL FIELD

The present invention relates to a vehicle drive train test system and a vehicle drive train test method.

BACKGROUND ART

As conventional test benches for vehicles and parts of vehicles, there have been known some test benches such as, as disclosed in Patent Literature 1, a chassis dynamometer for testing finished vehicles, and as disclosed in Patent Literature 2, a vehicle drive train test apparatus for testing vehicle drive trains such as power trains.

The chassis dynamometer performs a running test in a predetermined running pattern simulating an actual run with a finished vehicle mounted on a roller. During the test, not only the running performance and the like of the vehicle, but fuel consumption, components of exhaust gas, and the like are measured with an exhaust gas measuring apparatus and the like provided for the test bench interlocked with the chassis dynamometer.

On the other hand, the vehicle drive train test apparatus tests a vehicle drive train while simulating a load during an actual run with a loading device such as a dynamometer connected to the rotating shaft of the vehicle drive train including an engine, a power train, and the like. During the test as well, in addition to the manufacturing method of the vehicle drive train, fuel consumption, components of exhaust gas, and the like are measured.

CITATION LIST

Patent Literatures

Patent Literature 1: Japanese Unexamined Patent Application Publication No. 2011-149921
Patent Literature 2: Japanese Unexamined Patent Application Publication No. 2015-127651

SUMMARY OF INVENTION

Technical Problem

Meanwhile, in recent years, there has been a demand to accurately reproduce an actual vehicle run on a chassis dynamometer using the above-described vehicle drive train test apparatus, and the present inventor has performed a test with a speed pattern as input values to the chassis dynamometer and loads corresponding to the speed pattern inputted to the vehicle drive trains test apparatus. As a result, the present inventor has found that test results (e.g., fuel consumption and exhaust gas component concentrations) obtained by the vehicle drive train test apparatus deviate from those obtained as a result of an actual vehicle run on the chassis dynamometer.

Therefore, the present inventor has intensively examined the cause for the deviation in the above-described test results.

In an actual vehicle run on a normal chassis dynamometer, a load applied to a vehicle is controlled correspondingly to the rotation speed of the roller mounted with tires. Specifically, the roller rotates in synchronization with the rotation of the tires of a vehicle, and correspondingly to the rotation speed of the roller, the load is applied to the roller from the chassis dynamometer.

However, in the actual vehicle run on the chassis dynamometer, the rotation speed of the roller and the rotation speed of axles may not coincide with each other due to the deformation of the tires associated with the rotation.

For example, as illustrated in FIG. 4, at a start on a roller, the axle of a vehicle first starts to rotate. At this time, a tire does not rotate but deforms in association with the rotation of the axle. Then, after the deformation of the tire associated with the rotation of the axle, the tire starts to rotate, and together with the tire, the roller starts to rotate. A load applied to the vehicle is controlled correspondingly to the rotation speed of the roller.

On the other hand, in a vehicle drive train test, the load applied to a vehicle drive train is controlled correspondingly to the rotation speed of the dynamometer. Specifically, the dynamometer rotates in synchronization with the rotation of axles, and correspondingly to the rotation speed of the dynamometer, the load is applied to the axles from the dynamometer. That is, the rotation speed of the axles is the same as that of the dynamometer.

In that case, in the vehicle drive train test apparatus, since the load is controlled correspondingly to the rotation speed of the axles, the dynamometer is controlled correspondingly to rotation speed different from the rotation speed of the axles of the vehicle running on the chassis dynamometer. That is, the vehicle drive train test apparatus does not take account of a response delay of a variation in roller rotation with respect to a variation in axle rotation assumed in the actual vehicle run on the chassis dynamometer. As a result, it has been found that the vehicle drive train test apparatus cannot reproduce the actual vehicle run on the chassis dynamometer, and therefore the test results obtained by the vehicle drive train test apparatus are different from those obtained by the actual vehicle run on the chassis dynamometer.

Therefore, the present invention has been made in order to solve the above-described problem, and a main object thereof is to make it possible to reproduce an actual vehicle run on a chassis dynamometer in a vehicle drive train test.

Solution to Problem

That is, a vehicle drive train test system according to the present invention includes: a loading device to be connected to a rotating shaft of a vehicle drive train; and a load controller that controls the loading device to change a load. In addition, the load controller includes a relationship data storage part adapted to store speed-load relationship data indicating the relationship between rotation speed of the loading device and a load corresponding to the rotation speed, and changes the timing of the load to be given by the loading device correspondingly to the rotation speed of the loading device with respect to timing determined by the speed-load relationship data.

Also, a vehicle drive train test method is one that connects a loading device to a rotating shaft of a vehicle drive train and makes the loading device change a load. In addition, the vehicle drive train test method changes the timing of the load to be given by the loading device correspondingly to the rotation speed of the loading device with respect to timing determined by speed-load relationship data indicating the relationship between rotation speed of the loading device and a load corresponding to the rotation speed.

In such configurations, since the timing of the load to be given by the loading device correspondingly to the rotation speed of the loading device is changed with respect to timing determined by the speed-load relationship data indicating the relationship between rotation speed of the loading device and a load corresponding to the rotation speed, the difference in rotation speed between a roller and an axle of a vehicle, which is caused by tire deformation of a vehicle running on a chassis dynamometer, can be reproduced. Accordingly, an actual vehicle run on the chassis dynamometer can be reproduced in the vehicle drive train test system. As a result, for example, the front loading of a vehicle test using a chassis dynamometer can be achieved.

Specifically, it is conceivable that the load controller includes: an operation speed calculation part that, from rotation speed of the loading device, calculates operation speed simulating rotation speed of a roller; and a load control part that controls the loading device so as to apply a load corresponding to the operation speed to the loading device with use of the speed-load relationship data.

Specifically, the load controller compensates rotation speed of the rotating shaft for the tire deformation associated with rotation. That is, it is conceivable that the operation speed calculation part calculates the operation speed by compensating the rotation speed of the loading device for the tire deformation associated with the rotation with one or more variables contributing to the tire deformation as parameters. By changing the load correspondingly the operation speed, the timing of the load to be given by the loading device correspondingly to the rotation speed of the loading device is delayed with respect to timing determined by the speed-load relationship data.

As the variables contributing to the tire deformation associated with the rotation, ones such as the elasticity of a tire, the size of the tire, the material of the tire, the shape of the tire (tread shape, rim shape, etc.), the temperature of the tire, acceleration, torque, and the load of a vehicle can be cited.

In addition, it is also conceivable that the load controller includes a relationship data compensation part that compensates the speed-load relationship data for the tire deformation associated with the rotation with the one or more variables contributing to the tire deformation as parameters, and controls the loading device with use of the compensated speed-load relationship data. This eliminates the need to separately calculate the operation speed from the rotation speed of the loading device, and therefore control processing can be sped up.

Tire deformation associated with rotation in an actual vehicle run on a chassis dynamometer appears at a start, at acceleration, or at deceleration. For this reason, it is conceivable that at the start of rotation of the loading device, at acceleration, and at deceleration, the load controller changes the timing of the load to be given by the loading device correspondingly to the rotation speed of the loading device with respect to timing determined by the speed-load relationship data. In particular, at the start, at a transition from acceleration to deceleration, or at a transition from deceleration to acceleration, the tire deformation associated with the rotation is thought to notably appear, and therefore it is conceivable that at the start of rotation of the loading device, at the transition from acceleration to deceleration, and at the transition from deceleration to acceleration, the load controller changes the timing of the load to be given by the loading device correspondingly to the rotation speed of the loading device with respect to timing determined by the speed-load relationship data.

Also, the vehicle drive train test system according to the present invention includes: a loading device to be connected to a rotating shaft of a vehicle drive train; and a load controller that controls the loading device to change a load. In addition, the load controller changes the load by the loading device correspondingly to the rotation speed of a roller mounted with a tire in a chassis dynamometer.

In such a configuration, since the load is changed correspondingly to the rotation speed of the roller mounted with the tire in the chassis dynamometer, the difference between the rotation speed of the roller and the rotation speed of an axle of a vehicle, which is caused by the tire deformation of the vehicle running on the chassis dynamometer, can be reproduced. Accordingly, an actual vehicle run on the chassis dynamometer can be reproduced in the vehicle drive train test system. As a result, for example, the front loading of a vehicle test using a chassis dynamometer can be achieved.

Advantageous Effects of Invention

According to the present invention configured as described above, an actual vehicle run on a chassis dynamometer can be reproduced in a vehicle drive train test.

DESCRIPTION OF EMBODIMENTS

In the following, one embodiment of the vehicle drive train test system according to the present invention will be described with reference to drawings.

A vehicle drive train test system 100 of the present embodiment is one for evaluating the performance and the like of a vehicle drive train 10 as a test object, and specifically one that tests an engine 11 and a power train 12 (also referred to as a drive line). Note that the power train 12 is one including at least one of a transmission (manual, automatic, or CVT), differential gears, axles, drive shafts, and the like. The power train 12 herein may be one for rear-wheel drive illustrated in FIG. 1, one for front-wheel drive, or one for four-wheel drive.

Figure 1:
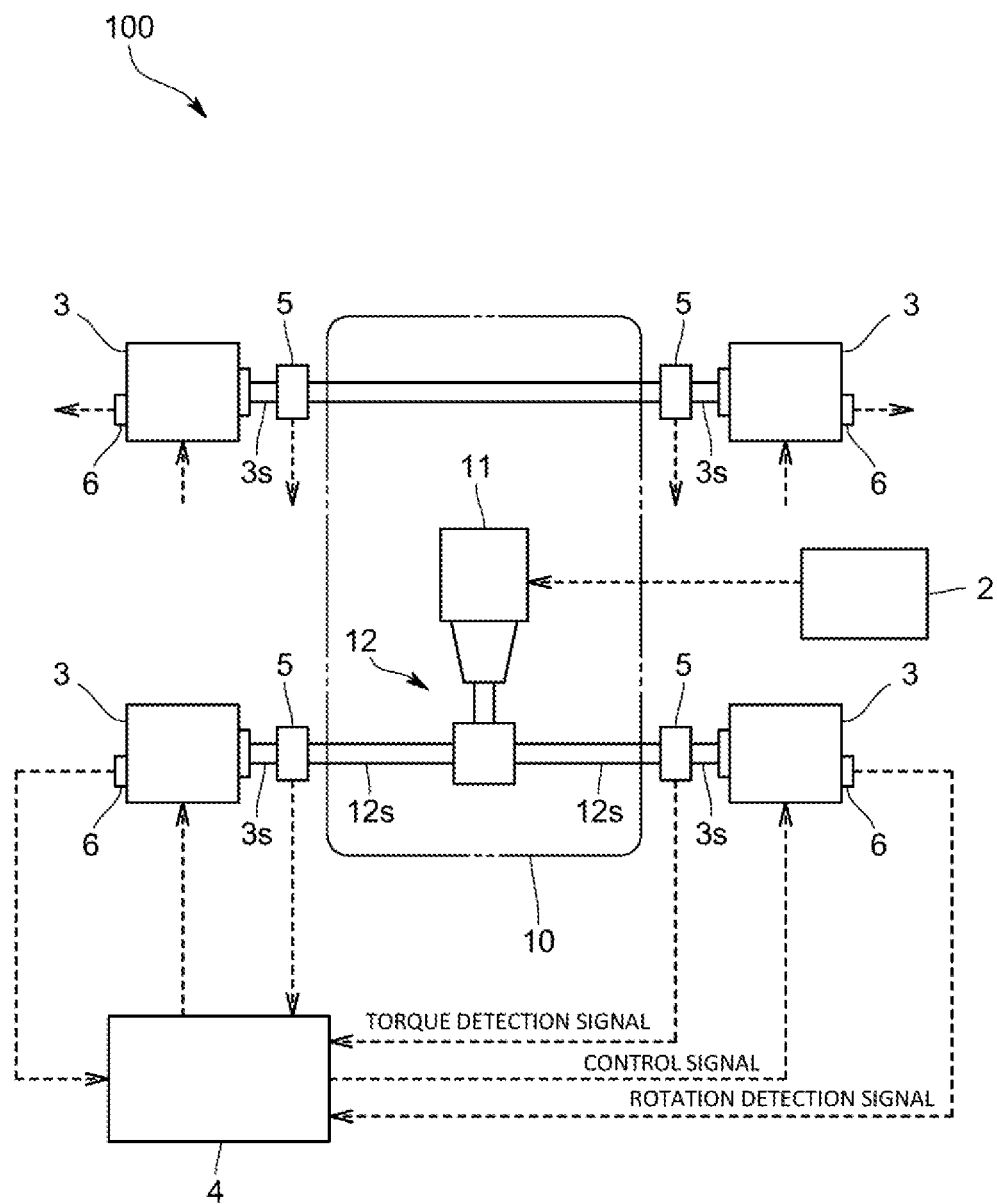
FIG. 1 is a schematic diagram illustrating the configuration of a vehicle drive train test system according to the present embodiment.

In the example illustrated in FIG. 1, the vehicle drive train test system 100 includes: a drive train controller 2 for controlling the vehicle drive train 10; loading devices 3 respectively connected to at least two axles (rotating shafts) 12s including drive shafts of the power train 12; and a load controller 4 for controlling the loading devices 3. The present embodiment illustrates the example where in addition to the two axles 12s serving as the drive shafts, two axles connected with non-driving wheels are also connected with loading devices 3. In addition, the vehicle drive train 10 as a test object and the respective loading devices 3 are arranged in a test chamber, and the respective controllers 2 and 4 may be arranged in a control chamber different from the test chamber.

Note that the vehicle drive train 10 refers to a concept including an engine single body, and in this case, the vehicle drive train test system 100 is one including: the loading devices 3 connected to the engine as the vehicle drive train 10; and the load controller 4 for controlling the loading devices 3.

The drive train controller 2 is one for controlling the engine 11 and the power train 12 under predetermined test conditions. Specifically, the drive train controller 2 is one that controls a throttle opening level by inputting a throttle opening level signal to the engine 11 and also controls a gear ratio and the like by inputting a control signal to the transmission of the power train 12.

In addition, when the vehicle drive train 10 is equipped with an automatic driving robot, the drive train controller 2 is one that by inputting a control signal to each of actuators of the automatic driving robot, controls the throttle opening level of the engine 11 and the transmission (in particular, the selection of a manual reduction ratio (gear) and the operation of a clutch). The actuators include those of, for example, an accelerator operation part, a brake operation part, a shift lever operation part, a clutch operation part, and the like.

Each of the loading devices 3 is one that simulates running resistance acting on a wheel connected to a corresponding axle 12$s$, and consists of an absorption dynamometer. A rotating shaft 3$s$ of each of the loading devices 3 is connected to a corresponding axle 12$s$ via a torque meter 5. Also, the loading devices 3 are respectively provided with rotation detectors 6 for detecting the rotation speeds of corresponding rotating shafts 3$s$. In addition, the rotation detectors 6 may be ones that are provided on the vehicle drive train 10 side and detect the rotations of corresponding axles 12$s$.

The load controller 4 is one that controls the absorption dynamometers as the loading devices 3 under the predetermined test conditions, and performs rotation speed control and torque control on the basis of detection signals from the torque meters 5 and rotation detectors 6.

Note that the drive train controller 2 and the load controller 4 are dedicated or general-purpose computers each including a CPU, an internal memory, an AD converter, an input/output interface, input means such as a mouse and a keyboard, display means such as a display DP, and the like. In addition, the drive train controller 2 and the load controller 4 may be configured as a common computer or as multiple computers respectively having corresponding functions.

Further, the vehicle drive train test system 100 of the present embodiment is configured to be capable of reproducing an actual vehicle run on a chassis dynamometer.

The load controller 4 stores speed-load relationship data 40 indicating the relationship between rotation speed of the rotating shaft 3$s$ of each of the loading devices 3 and a load corresponding to the rotation speed, and using the speed-load relationship data 40, controls that loading device 3 so as to apply a load corresponding to rotation speed of the rotating shaft 3$s$ to the axle 12$s$ connected to the rotating shaft 3$s$. In addition, the speed-load relationship data 40 is one compatible with, for example, the WLTP (worldwide harmonized light vehicles test procedure) mode run, and preliminarily inputted by an operator or the like and stored in a relationship data storage part 41 (see FIG. 2) provided in the load controller 4.

Further, the load controller 4 is one that controls the loading device 3 so as to change the load correspondingly to the rotation speed of a roller mounted with tires in a chassis dynamometer. Specifically, the load controller 4 controls the loading device 3 so as to delay the timing of the load, which is determined by the speed-load relationship data 40 and to be given correspondingly to the rotation speed of the loading device, with respect to timing determined by the speed-load relationship data 40.

Figure 2:
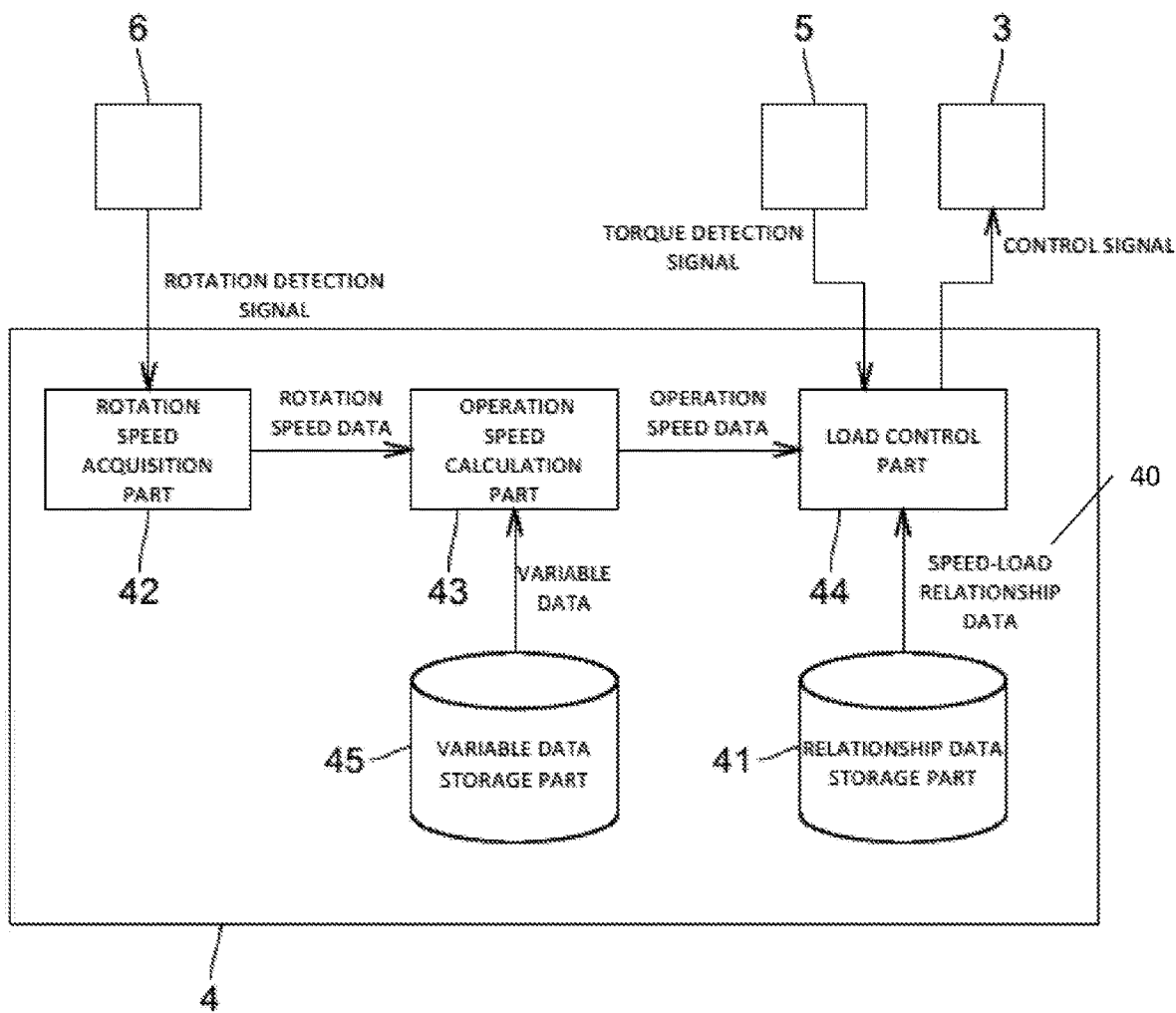
FIG. 2 is a functional block diagram of a load controller according to the same invention.

More specifically, as illustrated in FIG. 2, the load controller 4 includes: a rotation speed acquisition part 42 adapted to acquire the rotation speed of the rotating shafts 3 of the loading device 3 (equal to the rotation speed of the axle 12$s$); an operation speed calculation part 43 adapted to calculate operation speed by compensating the rotation speed of the rotating shafts 3$a$ for tire deformation associated with rotation with one or more variables contributing to the tire deformation as parameters; and a load control part 44 adapted to, from the operation speed obtained by the operation speed calculation part 43 and the speed-load relationship data 40, generate a control signal to be inputted to the loading device 3.

The rotation speed acquisition part 42 is one that upon receipt of a detection signal from a corresponding rotation detector 6, calculates the rotation speed of the rotating shaft 3$s$ from the detection signal. Then, the rotation speed acquisition part 42 transmits rotation speed data indicating the calculated rotation speed to the operation speed calculation part 43. Alternatively, the rotation speed acquisition part 42 may be one adapted to acquire rotation speed data externally calculated from the detection signal of the rotation detector 6.

The operation speed calculation part 43 is one that compensates the rotation speed acquired by the rotation speed acquisition part 42 for the tire deformation associated with the rotation. That is, the operation speed calculation part 43 calculates the operation speed that takes account of a response delay of a variation in roller rotation with respect to a variation in axle rotation assumed in the actual vehicle run on the chassis dynamometer. Specifically, the operation speed calculation part 43 calculates the operation speed by compensating the rotation speed of the rotating shaft 3$s$ for the tire deformation associated with the rotation with the one or more variables contributing to the tire deformation as parameters. The operation speed is one that simulates the rotation speed of the roller during the actual vehicle run on the chassis dynamometer. Then, the operation speed calculation part 43 transmits operation speed data indicating the calculated operation speed to the load control part 44.

Note that as the variables contributing to the tire deformation associated with the rotation (deformation compensating variables), ones such as the elasticity of the tires, the size of the tires, the material of the tires, the shape of the tires (tread shape, rim shape, etc.), the temperature of the tires, acceleration, torque, and the load of the vehicle can be cited. In addition, the acceleration can be obtained by differentiating the rotation speed obtained from the detection signal of the rotation detector 6, and also obtained by a speed pattern to be inputted to the drive train controller 2. Further, the torque can be obtained from a detection signal of a corresponding torque meter 5, and also obtained by running resistance to be inputted to a controller of the chassis dynamometer. Variable data indicating these deformation compensating variables is preliminarily inputted by an operator or the like, and stored in a variable data storage part 45 provided in the load controller 4.

The load control part 44 is one that, using the speed-load relationship data 40, controls the loading device 3 so as to apply a load corresponding to the operation speed to the loading device 3. Specifically, the load control part 44 acquires the operation speed data from the operation speed calculation part 43, and also acquires the speed-load relationship data 40 from the relationship data storage part 41 to, from the operation speed data and the speed-load relationship data 40, generate the control signal to be inputted to the loading device 3. Then, the load control part 44 inputs the control signal to the loading device 3 to perform load control on the loading device 3. By performing the control correspondingly to the operation speed resulting from the compensation for the tire deformation as described, the load is changed correspondingly to the rotation speed of the roller mounted with the tires in the chassis dynamometer, and the timing of the load to be given by the loading device 3 correspondingly to the rotation speed of the loading device 3 is delayed with respect to the timing determined by the speed-load relationship data 40 indicating the relationship between rotation speed of the loading device 3 and a load corresponding to the rotation speed.

Next, the operation of the vehicle drive train test system 100 of the present embodiment will be described.

The data on the deformation compensating variables contributing to the tire deformation of the vehicle used for the actual vehicle run on the chassis dynamometer is preliminarily stored in the variable data storage part 45 of the load controller 4.

When a vehicle drive train test is started, the drive train controller 2 starts to control the engine 11 and the like of the vehicle drive train 10 on the basis of a predetermined speed pattern. This allows the axle 12s to start rotation. At this time, since the axle 12s and the loading device 3 are connected to each other, the rotating shafts 3s of the loading device 3 start to rotate together with the axle 12s. The rotation is detected by the rotation detector 6 provided on the loading device 3 side, and inputted to the rotation speed acquisition part 42 of the load controller 4.

The rotation speed acquisition part 42 of the load controller 4 calculates the rotation speed of the rotating shaft 3s (axle 12s) from the detection signal of the rotation detector 6. Also, from the rotation speed of the axle 12s and the deformation compensating variables, the operation speed calculation part 43 calculates the operation speed by compensating for the tire deformation. For example, given that the rotation speed is 0.5 rpm, the operation speed calculation part 43 calculates the operation speed corresponding to the rotation speed of the roller of the chassis dynamometer, such as an operation speed of 0.47 rpm, with the deformation compensating variables as parameters. Then, on the basis of the operation speed data indicating the operation speed and the speed-load relationship data 40, the load control part 45 generates the control signal to be inputted to the loading device 3, and inputs the control signal to the loading device 3. Controlling the loading device 3 in such a control sequence enables the actual vehicle run on the chassis dynamometer to be reproduced using the vehicle drive train test system 100.

Effects of the Present Embodiment

In the vehicle drive train test system 100 of the present embodiment configured as described above, since in order to simulate the rotation behavior of the chassis dynamometer, the timing of the load to be given by the loading device 3 correspondingly to the rotation speed of the loading device 3 is changed with respect to the timing determined by the speed-load relationship data 40 indicating the relationship between rotation speed of the loading device 3 and a load corresponding to the rotation speed, the difference in rotation speed between the roller and the axle of the vehicle, which is caused by the tire deformation of the vehicle running on the chassis dynamometer, can be reproduced. As a result, the vehicle test using the chassis dynamometer can be reproduced using the vehicle drive train test system 100.

Note that the present invention is not limited to the above-described embodiment.

For example, the above-described embodiment exemplifies a four-axle drive train test system in which the loading devices 3 are connected to the four axles of the power train; however, in the case of 2WD, the present invention may be a two-axle drive train test system in which loading devices are connected to two axles connected with driving wheels.

Also, the present invention may be a three- or five-axle drive train test system in which a drive dynamometer simulates the behavior of an engine and loading devices are connected to two axles or four axles.

The above-described embodiment is one having the drive train controller 2; however, when a driver operates operation pedals (an accelerator pedal, a brake pedal, and a clutch pedal), a shift lever, and the like equipped for the vehicle drive train, it is not necessary to have the drive train controller 2. In this case, the vehicle drive train test system preferably includes a drivers' aid device adapted to aid a driver operating the vehicle drive train to drive.

Also, when the load controller 4 compensates the rotation speed of the rotating shaft 3s with the deformation compensating variables as parameters, the present invention may be adapted to input the compensated rotation speed to a drivers' aid device or an automatic driving robot for feedback control. When the vehicle drive train test system includes a drivers' aid device, it is conceivable to display the compensated rotation speed together with a driving speed pattern on a display of the drivers' aid device. Feeding the compensated rotation speed back to the drivers' aid device as described enables the drivers' aid device to be controlled at the same speed as that of the actual vehicle run on the chassis dynamometer. In addition, displaying the compensated rotation speed on the display of the drivers' aid device enables a driver to, in the vehicle drive train test system, drive in the same manner as the actual vehicle run on the chassis dynamometer.

Figure 3:
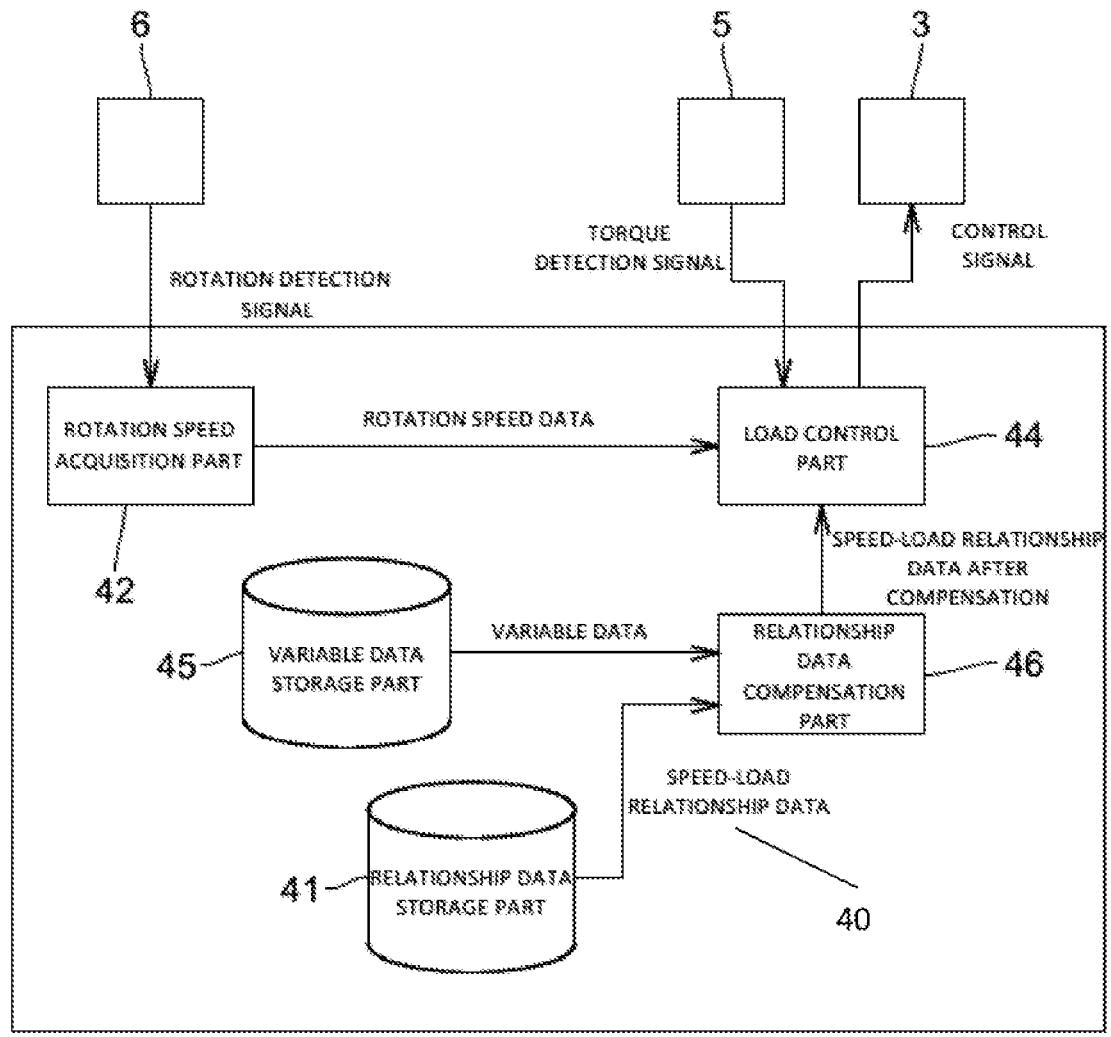
FIG. 3 is a functional block diagram of a load controller according to a variation.
Figure 4:
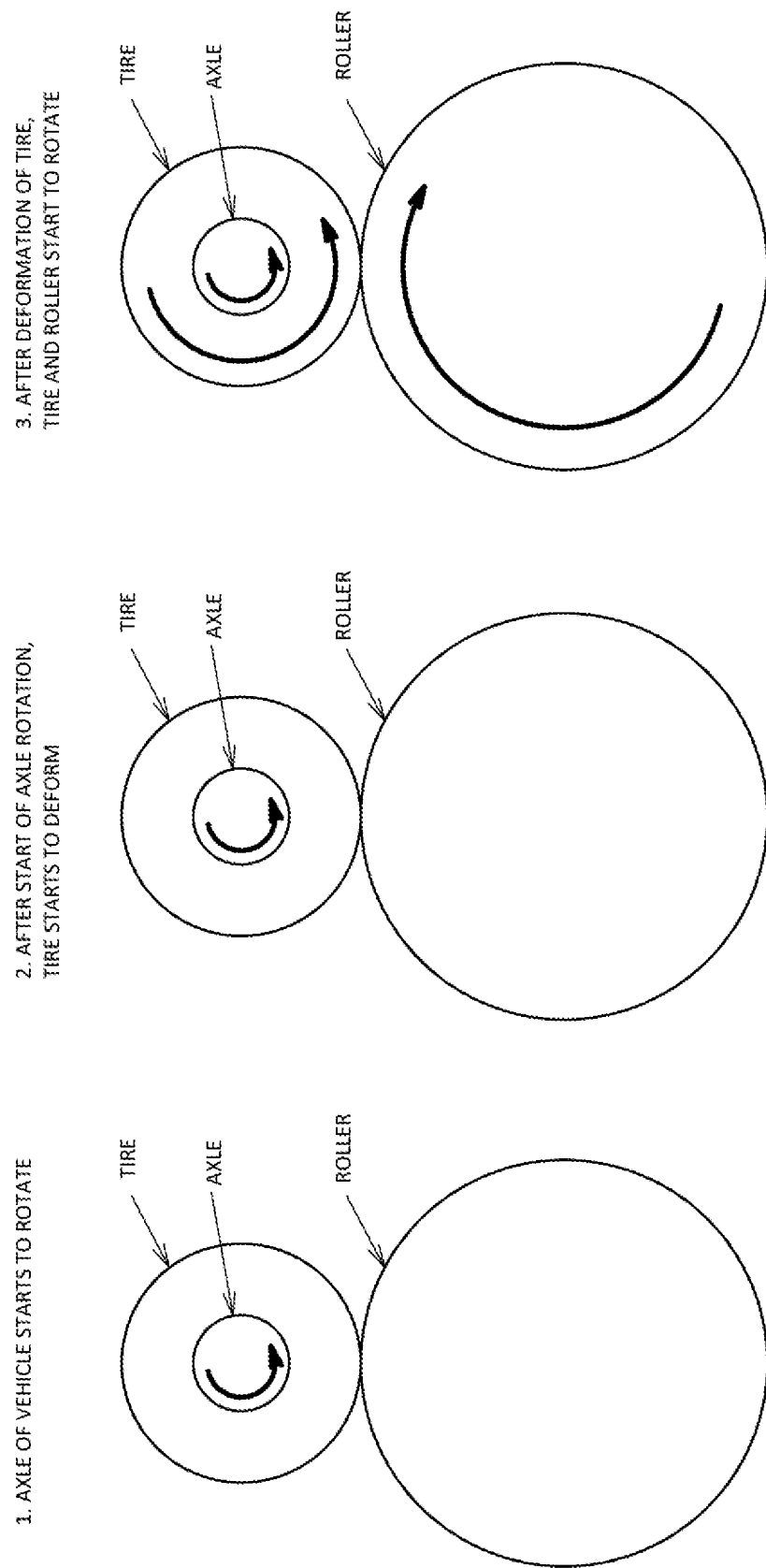
FIG. 4 is a diagram illustrating the rotations of a roller and an axle during an actual vehicle run on a chassis dynamometer in a conventional case.

Further, the load controller 4 in the above-described embodiment is one that compensates the rotation speed of the loading device with the variables contributing to the tire deformation as parameters, but as illustrated in FIG. 3, may be one having a relationship data compensation part 46 adapted to compensate the speed-load relationship data 40 inputted to the load controller 4 in consideration of the tire deformation. In this case, the load control part 44 generates the control signal using the compensated speed-load relationship data obtained by the relationship data compensation part 46 and data on the rotation speed of the axle, and controls the loading device 3. In addition, when the axle 12s and the roller of the chassis dynamometer are thought to rotate at mutually the same speed during the rotation of the axle, such as at low speed rotation or at a low load (low torque) other than at acceleration equal to or more than a predetermined acceleration and at deceleration equal to or more than a predetermined deceleration, the speed-load relationship data 40 before the compensation may be used.

Also, the present invention may be adapted to measure the actual rotation speed of each axle when running a finished vehicle on the chassis dynamometer, and using the difference between the measured rotation speed of the axle and the rotation speed of the roller, compensate a predetermined speed pattern to be inputted to the load controller. In this case, the load controller includes a speed pattern compensation part, and the loading device 3 may be controlled in accordance with the speed pattern compensated by the speed pattern compensation part.

Further, during the actual vehicle run on the chassis dynamometer, at a start, at a transition from acceleration to deceleration, or at a transition from deceleration to acceleration, the degree of the tire deformation increases, and therefore the operation speed calculation part 43 may be adapted to compensate the rotation speed of the rotating shaft 3s of the loading device 3 for the tire deformation only at the rotation start of the rotating shaft 3s of the loading device 3, at the transition from acceleration to deceleration, and at the transition from deceleration to acceleration, and change the load correspondingly to the rotation speed of the roller of the chassis dynamometer. Also, the operation speed calculation part 43 may change a compensating operation among at the rotation start of the rotating shaft 3s of the loading device 3, at the transition from acceleration to deceleration, and at the transition from deceleration to acceleration.

In addition, when the rotating shaft 3s of the loading device 3 and the roller of the chassis dynamometer are thought to rotate at mutually the same speed, such as at constant speed rotation or at a low load (low torque) other than at the rotation start of the rotating shaft 3s of the loading device 3, at acceleration equal to or more than a predetermined acceleration, and at deceleration equal to or more than a predetermined deceleration, the load control part 45 may be adapted to generate the control signal using data on the rotation speed of the axle 12s before the compensation.

Further, the load controller may be one that controls the loading device to change the load with, in addition to the one or more variables contributing to the tire deformation associated with the rotation, a tire skid with respect to the roller mounted with the tires in the chassis dynamometer as a parameter. This configuration makes it possible to reproduce not only the deformation behavior of the tires but also the skid behavior of the tires, and therefore the actual vehicle run on the chassis dynamometer can be more accurately reproduced.

Still further, using the vehicle drive train test system of the above-described embodiment makes it possible to perform a gear change/gear synchronization test, the shift calibration of an automatic transmission, checks of main components (clutch, torque converter, differential gear, power unit, damper, electronic control unit, suspension, and exhaust system), the endurance test/life test of a drive train and drive train components, a noise/vibration test, a performance/efficiency test, a function test, an exhaust gas test, and the like.

Besides, it should be appreciated that the present invention is not limited to the above-described embodiment but can be variously modified without departing from the scope thereof.

REFERENCE SIGNS LIST

100: Vehicle drive train test system
10: Vehicle drive train
11: Engine
12: Powertrain
12s: Rotating shaft (axle)
2: Drive train controller
3: Loading device
4: Load controller
40: speed-load relationship data
41: Relationship data storage part
42: Rotation speed acquisition part
43: Operation speed calculation part
44: Load control part
45: Variable data storage part
46: Relationship data compensation part

The invention claimed is:

1. A vehicle drive train test system comprising:
   an absorption dynamometer to be connected to a rotating shaft of a vehicle drive train; and
   a load controller that controls the absorption dynamometer to change a load, wherein the load controller is configured to
   store speed-load relationship data indicating a relationship between rotation speed of the absorption dynamometer and a load corresponding to the rotation speed,
   at a start of rotation of the absorption dynamometer, at acceleration, and at deceleration, change timing of the load to be given by the absorption dynamometer correspondingly to the rotation speed of the absorption dynamometer, in consideration of tire deformation associated with rotation of a corresponding tire by using an associated variable which is at least one of elasticity of the tire, size of the tire, material of the tire, shape of the tire, temperature of the tire, the acceleration, torque, or a load of the vehicle, with respect to timing determined by the speed-load relationship data,
   calculate operation speed simulating rotation speed of a roller from the rotation speed of the absorption dynamometer, and
   control the absorption dynamometer to apply the load corresponding to the operation speed simulating rotation speed of the roller with use of the speed-load relationship data.

2. The vehicle drive system test system according to claim 1, wherein the load controller is further configured to calculate the operation speed by compensating the rotation speed of the absorption dynamometer for the tire deformation associated with rotation with one or more variables contributing to the tire deformation as parameters.

3. The vehicle drive train test system according to claim 1, wherein the load controller is further configured to control the absorption dynamometer to change the load with a tire skid with respect to the roller mounted with the tire in a chassis dynamometer as a parameter.

4. A vehicle drive train test method that connects an absorption dynamometer to a rotating shaft of a vehicle drive train and makes the absorption dynamometer change a load, the vehicle drive train test method comprising:
   at a start of rotation of the absorption dynamometer, at acceleration, and at deceleration, changing timing of the load to be given by the absorption dynamometer correspondingly to rotation speed of the absorption dynamometer, in consideration of tire deformation associated with rotation of a corresponding tire by using an associated variable which is at least one of elasticity of the tire, size of the tire, material of the tire, shape of the tire, temperature of the tire, the acceleration, torque, or a load of the vehicle, with respect to timing determined by speed-load relationship data indicating a relationship between rotation speed of the absorption dynamometer and a load corresponding to the rotation speed;

calculating operation speed simulating rotation speed of a roller mounted with a tire in a chassis dynamometer from the rotation speed of the absorption dynamometer; and controlling the absorption dynamometer to apply the load corresponding to the operation speed simulating rotation speed of the roller with use of the speed-load relationship data.

5. A vehicle drive train test system comprising:

an absorption dynamometer to be connected to a rotating shaft of a vehicle drive train; and a load controller that controls the absorption dynamometer to change a load, Wherein the load controller is configured to store speed-load relationship data indicating a relationship between rotation speed of the absorption dynamometer and a load corresponding to the rotation speed, at a start of rotation of the absorption dynamometer, at acceleration, and at deceleration, change timing of the load to be given by the absorption dynamometer correspondingly to the rotation speed of the absorption dynamometer, in consideration of tire deformation associated with rotation of a corresponding tire by using an associated variable which is at least one of elasticity of the tire, size of the tire, material of the tire, shape of the tire, temperature of the tire, the acceleration, torque, or a load of the vehicle, with respect to timing determined by the speed-load relationship data, compensate the speed-load relationship data for tire deformation associated with rotation with one or more variables contributing to the tire deformation as parameters, wherein the compensated speed-load relationship data indicates a relationship between rotation speed of a roller mounted with a tire in a chassis dynamometer and a load corresponding to the rotation speed of the roller, and control the absorption dynamometer to apply the load corresponding to the rotation speed of the roller with use of the compensated speed-load relationship data.

6. A vehicle drive train test method that connects an absorption dynamometer to a rotating shaft of a vehicle drive train and makes the absorption dynamometer change a load, the vehicle drive train test method comprising:

at a start of rotation of the absorption dynamometer, at acceleration, and at deceleration, changing timing of the load to be given by the absorption dynamometer correspondingly to rotation speed of the absorption dynamometer, in consideration of tire deformation associated with rotation of a corresponding tire by using an associated variable which is at least one of elasticity of the tire, size of the tire, material of the tire, shape of the tire, temperature of the tire, the acceleration, torque, or a load of the vehicle, with respect to timing determined by speed-load relationship data indicating a relationship between rotation speed of the absorption dynamometer and a load corresponding to the rotation speed;

compensating the speed-load relationship data for tire deformation associated with rotation with one or more variables contributing to the tire deformation as parameters, wherein the compensated speed-load relationship data indicates a relationship between rotation speed of a roller mounted with a tire in a chassis dynamometer and a load corresponding to the rotation speed of the roller; and controlling, the absorption dynamometer to apply the load corresponding to the rotation speed of the roller with use of the compensated speed-load relationship data.

* * * * *